US010256681B2

United States Patent
Bastien

(10) Patent No.: US 10,256,681 B2
(45) Date of Patent: Apr. 9, 2019

(54) MOTOR HAVING REDUCED COGGING TORQUE

(71) Applicant: Nidec Motor Corporation, St. Louis, MO (US)

(72) Inventor: Ryan M. Bastien, Saint Charles, MO (US)

(73) Assignee: Nidec Motor Corporation, St. Louis, MO (US)

( * ) Notice: Subject to any disclaimer, the term of this patent is extended or adjusted under 35 U.S.C. 154(b) by 619 days.

(21) Appl. No.: 14/591,808

(22) Filed: Jan. 7, 2015

(65) Prior Publication Data

US 2016/0197524 A1    Jul. 7, 2016

(51) Int. Cl.
   *H02K 1/14*      (2006.01)
   *H02K 29/03*    (2006.01)
   *H02K 15/02*    (2006.01)

(52) U.S. Cl.
   CPC ............ *H02K 1/148* (2013.01); *H02K 29/03* (2013.01); *H02K 2213/03* (2013.01)

(58) Field of Classification Search
   CPC .... H02K 2201/03; H02K 1/148; H02K 29/03; H02K 2213/03; H02K 23/405; H02K 15/062
   USPC .... 310/216.097, 216.092, 216.091, 216.093, 310/216.064, 156.46, 216.111, 216.113, 310/186
   See application file for complete search history.

(56) References Cited

U.S. PATENT DOCUMENTS

| | | | | |
|---|---|---|---|---|
| 893,228 A * | 7/1908 | Dunn | ..................... | H02K 23/40 310/216.092 |
| 3,919,576 A * | 11/1975 | Reinbeck | ............... | H02K 13/04 310/207 |
| 5,045,742 A * | 9/1991 | Armstrong | ............. | H02K 1/146 310/216.013 |
| 5,260,620 A * | 11/1993 | Morrill | ................. | H02K 17/08 310/166 |
| 7,453,179 B2 * | 11/2008 | Innami | ................ | B62D 5/0403 310/216.137 |
| 7,939,982 B2 | 5/2011 | Horst | | |

* cited by examiner

*Primary Examiner* — Tran N Nguyen
(74) *Attorney, Agent, or Firm* — Hovey Williams LLP

(57) ABSTRACT

An electric motor comprising a rotor rotatable about a rotor axis and a stator at least substantially circumscribing the rotor is provided. The stator includes a generally toroidal core including a plurality of arcuately spaced apart, radially inwardly extending teeth. Each of the teeth presents a radially innermost face that extends along a curved contour. A portion of the contour has a radius of curvature that corresponds to a circle having a center. The center is radially offset from the rotor axis. Furthermore, each of the teeth includes a radially extending arm having an end and a crown extending relative to the end. The crown presents a pair of arcuately spaced apart endmost tips, each of which has a rotor-facing side. The rotor-facing side includes a tapered portion that turns away from the rotor.

33 Claims, 9 Drawing Sheets

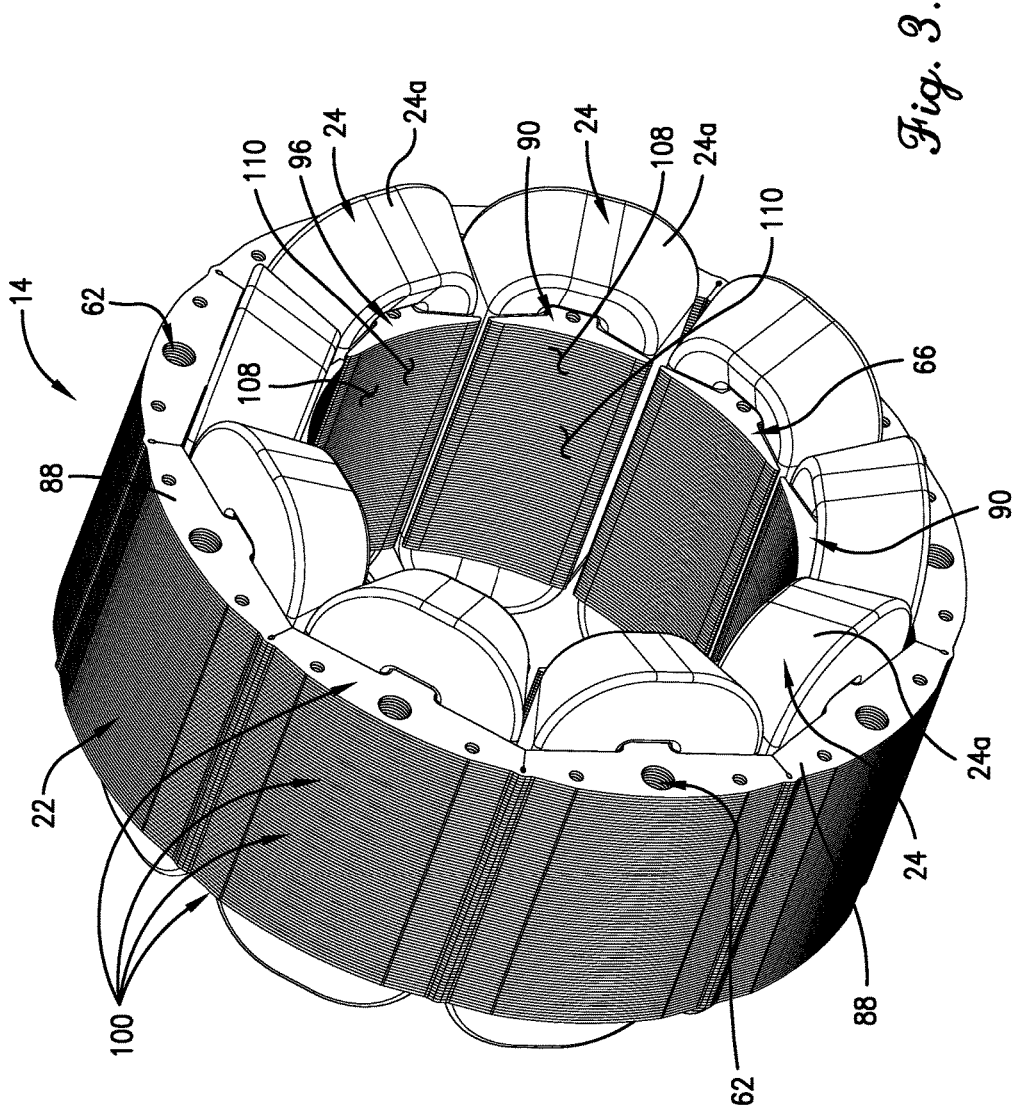

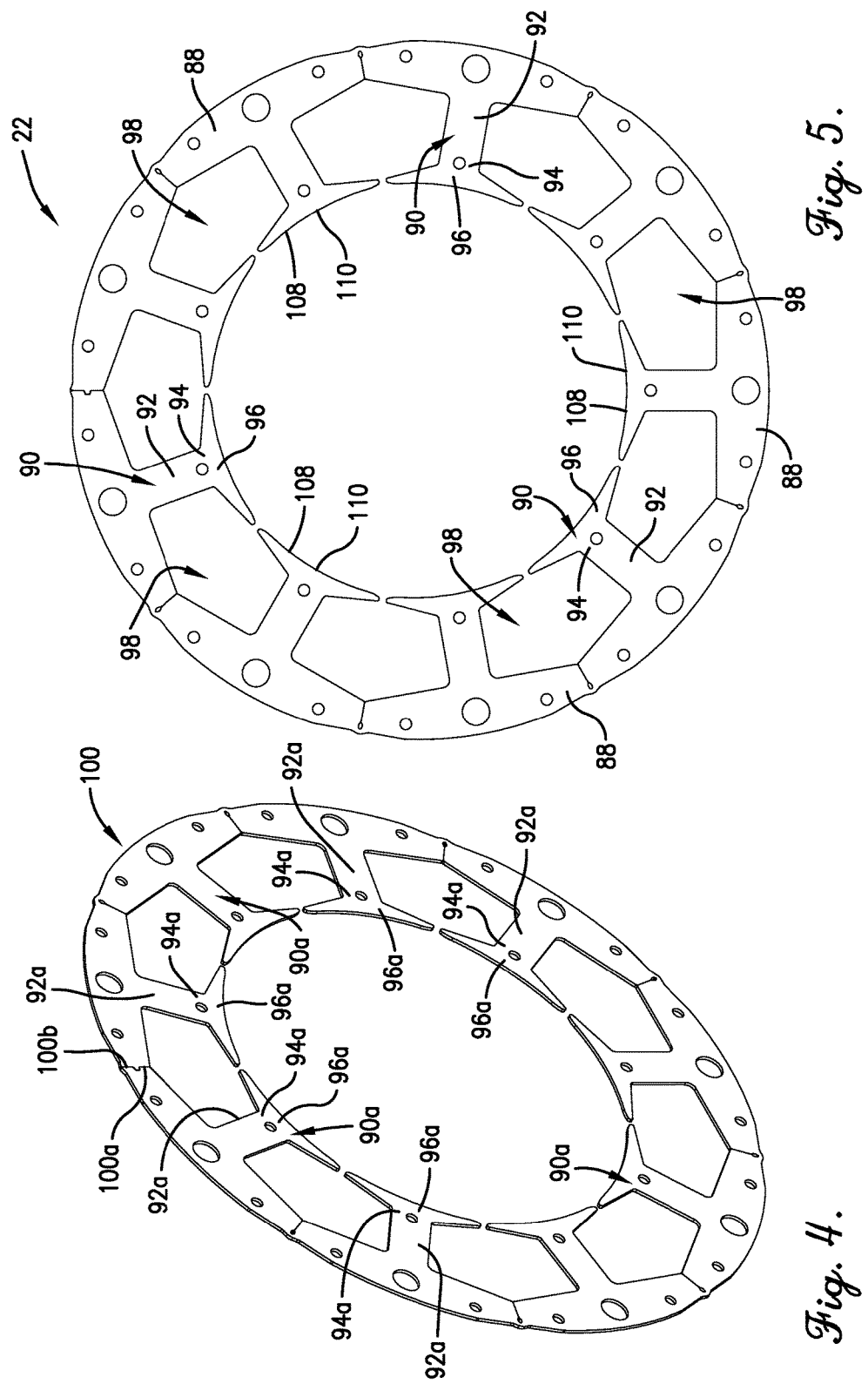

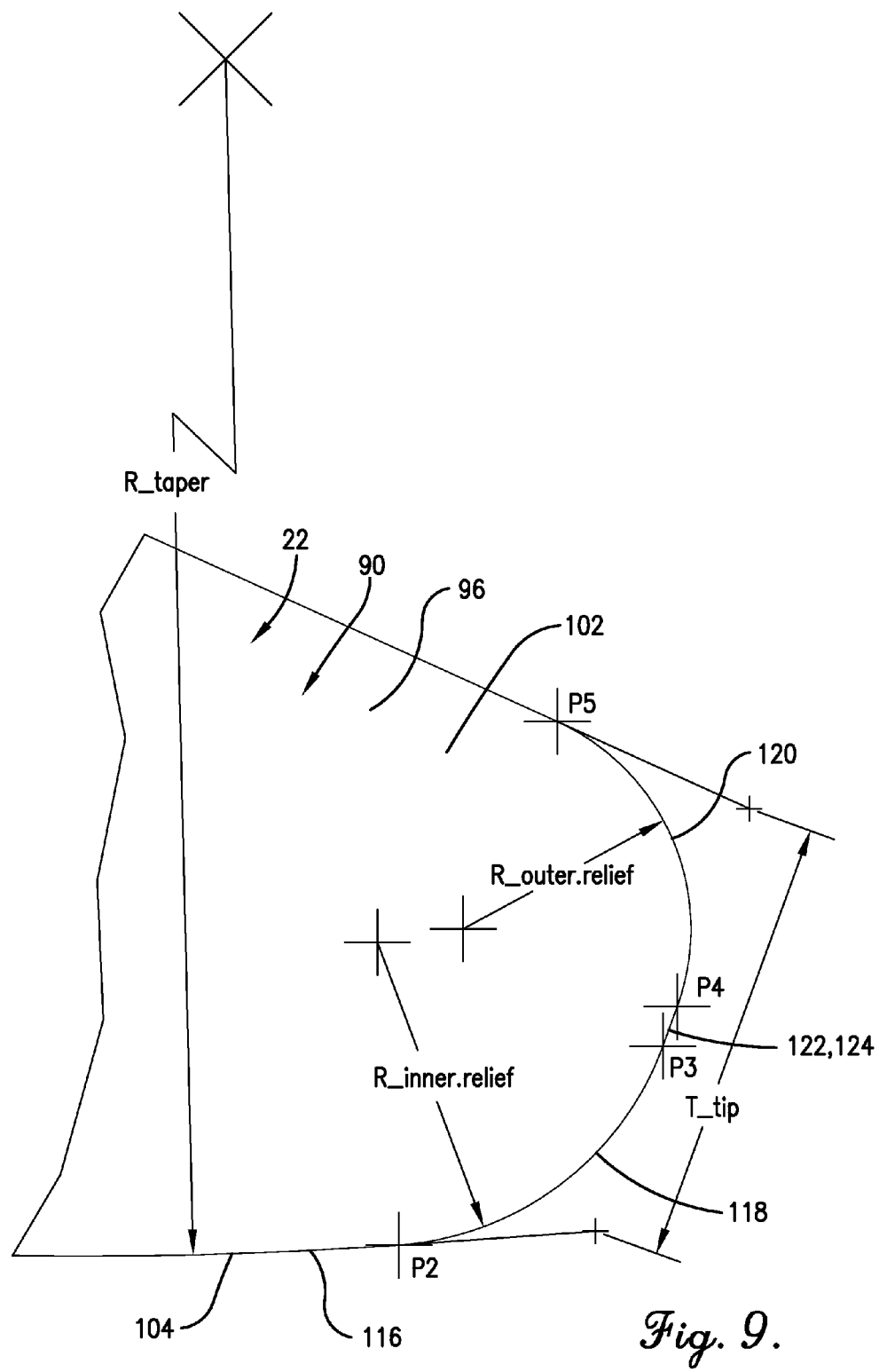

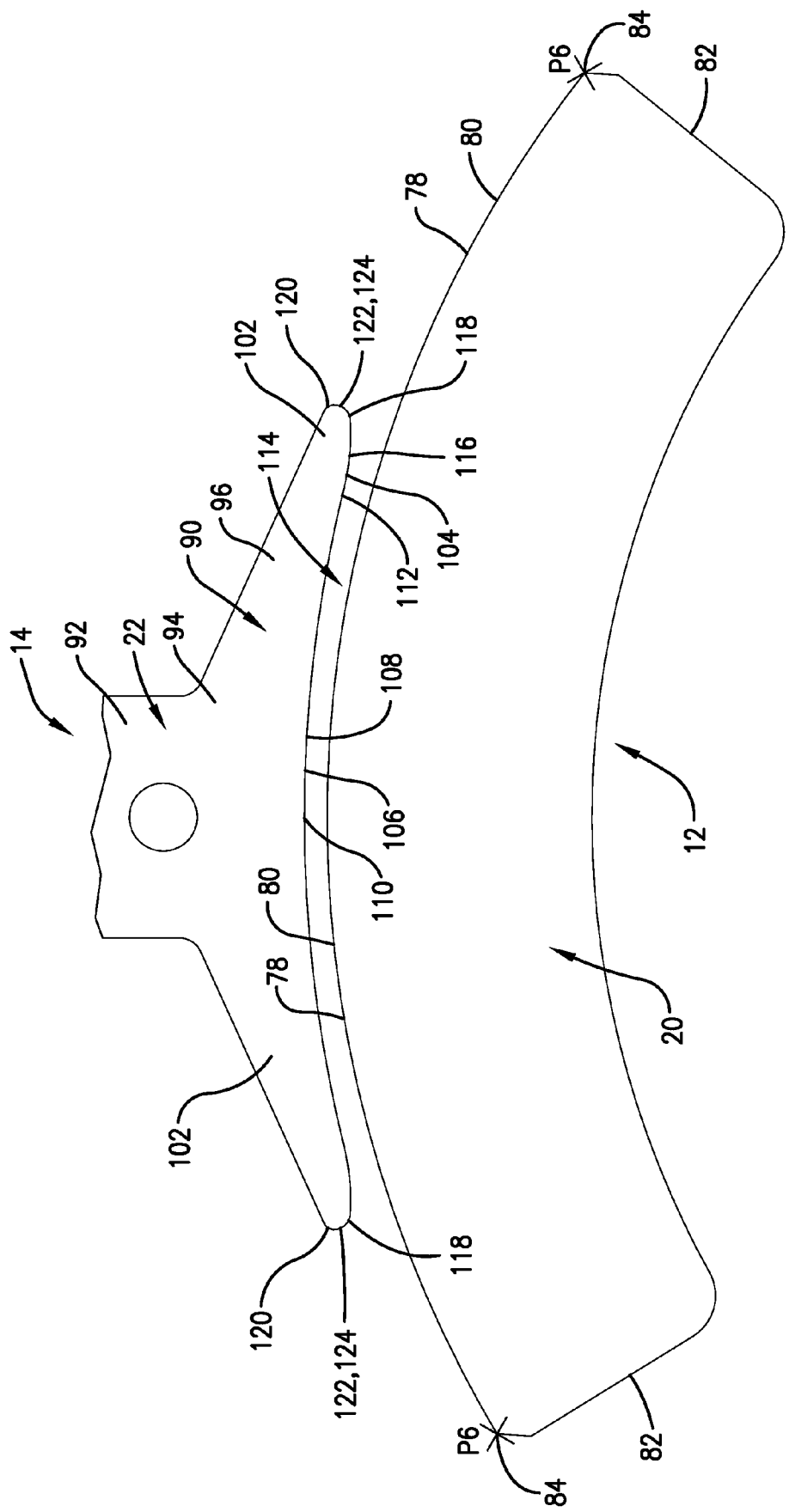

US 10,256,681 B2

MOTOR HAVING REDUCED COGGING TORQUE

BACKGROUND OF THE INVENTION

1. Field of the Invention

The present invention relates generally to an electric motor having a rotor and a stator configured in such a manner as to reduce the cogging torque of the motor.

2. Discussion of the Prior Art

Those of ordinary skill in the art will appreciate that electric motors are used in a variety of machines in which minimization of cogging torque is desirable. A variety of minimization techniques are known in the art. However, while such techniques may result in positive aspects of cogging torque reduction, motor performance may suffer.

SUMMARY

According to one aspect of the present invention, an electric motor is provided for use in a machine. The motor comprises a rotor rotatable about a rotor axis and a stator at least substantially circumscribing the rotor. The stator includes a generally toroidal core including a plurality of arcuately spaced apart, radially inwardly extending teeth. Each of the teeth presents a radially innermost face that extends along a curved contour. A portion of the contour has a radius of curvature that corresponds to a circle having a center. The center is radially offset from the rotor axis.

According to another aspect of the present invention, an electric motor is provided for use in a machine. The motor comprises a rotor rotatable about a rotor axis and a stator. The stator includes a generally toroidal core including a plurality of arcuately spaced apart teeth. Each of the teeth includes a radially extending arm having an end and a crown extending relative to the end. The crown presents a pair of arcuately spaced apart endmost tips, each of which has a rotor-facing side. The rotor-facing side includes a tapered portion that turns away from the rotor.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein:

FIG. 3 is a top, front perspective view of the stator of the motor of FIGS. 1 and 2, particularly illustrating the stator core and coils;

FIG. 4 is a top, front perspective view of a single lamination of the stator core of FIG. 3;

FIG. 5 is front view of the stator core of FIG. 3;

FIG. 9 is an enlarged view of a portion of the stator tooth of FIGS. 8 and 9, particularly illustrating the punch-relief radii and the tooth thickness; and FIG. 10 is an enlarged top view of a portion of a stator tooth and rotor magnet of FIGS. 1, 2, and 6, particularly illustrating the contour of the radially outermost magnet face.

Figure 1:
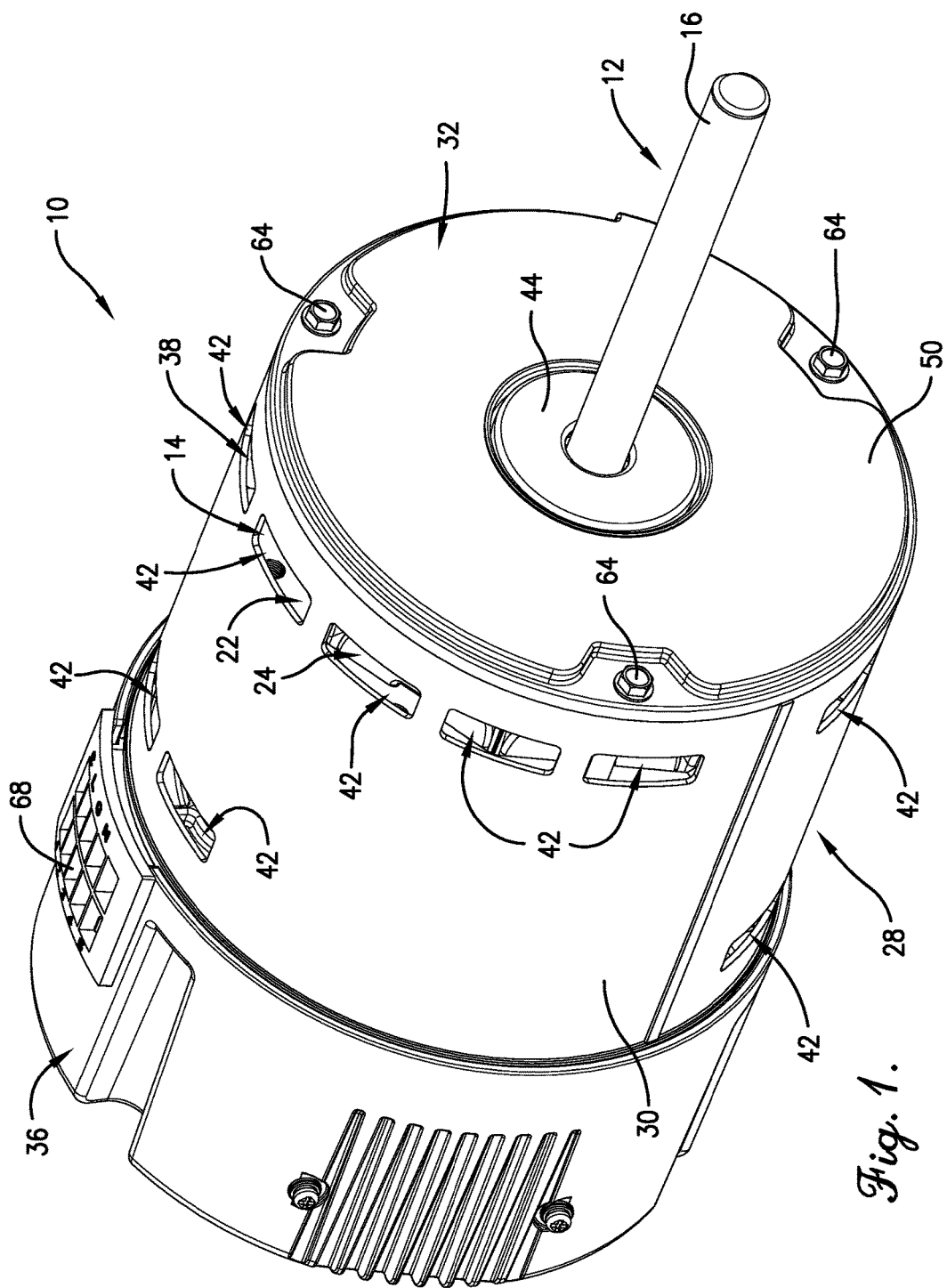
FIG. 1 is top, front perspective view of a motor constructed in accordance with a first preferred embodiment of the present invention.

The drawing figures do not limit the present invention to the specific embodiments disclosed and described herein. The drawings are not necessarily to scale, emphasis instead being placed upon clearly illustrating the principles of the preferred embodiments.

Furthermore, directional references (e.g., top, bottom, front, back, side, etc.) are used herein solely for the sake of convenience and should be understood only in relation to each other. For instance, a component might in practice be oriented such that faces referred to as "top" and "bottom" are sideways, angled, inverted, etc. relative to the chosen frame of reference.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Figure 2:
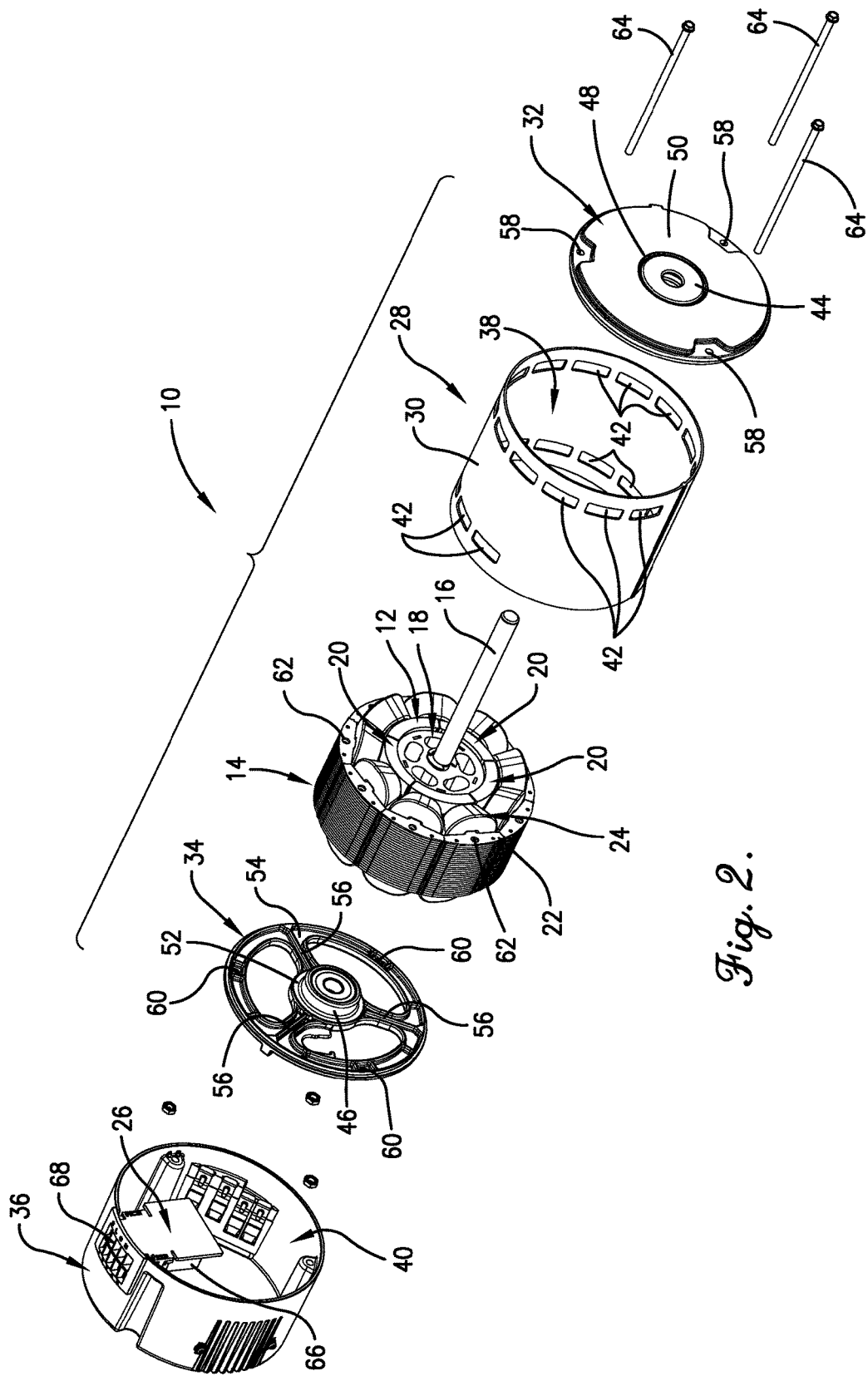
FIG. 2 is an exploded top, front perspective view of the motor of FIG. 1.

With initial reference to FIGS. 1 and 2, an electric motor 10 is provided for in a machine. In a preferred embodiment, the motor 10 is particularly configured for use in an air handling system. For instance, the motor 10 might be a blower motor for a residential heating, ventilation, and air conditioning (HVAC) system. However, alternative applications fall within the scope of the present invention.

The motor 10 broadly includes a rotor 12 and a stator 14. The rotor 12 is rotatable about an axis A_rotation, shown in FIG. 8. In a preferred embodiment, as shown, the stator 14 at least substantially circumscribes the rotor 12, such that the motor 10 is an inner rotor motor. It is permissible according to some aspects of the present invention, however, for the motor to be an outer rotor motor.

As will be discussed in greater detail below, the rotor 12 preferably includes a shaft 16, a rotor core 18, and a plurality of magnets 20. The stator 14 preferably includes a stator core 22 and a plurality of coils 24 wound around the stator core 22.

As best shown in FIGS. 1 and 2, the motor 10 further preferably includes a controller 26 and a housing 28. The housing 28 preferably includes a shell 30, a front endshield 32, a rear endshield 34, and a dripshield 36. The shell 30 and the front and rear endshields 32 and 34, respectively, preferably present a motor chamber 38 that at least substantially houses the stator 14 and the rotor 12. The dripshield 36 and the rear endshield 34 preferably present a controller chamber 40 in which the controller 26 is housed. Alternative housing configurations are permissible without departing from the scope of the present invention, however.

In a preferred embodiment, the shell 30 extends generally circumferentially about the stator 14 and defines a plurality of arcuately spaced apart ventilation openings 42. However, variations in shell design are permissible according to the present invention. The ventilation openings might be alternatively arranged, for instance, or excluded entirely, such that the motor is a closed motor. Furthermore, the shell might extend in such a manner as to provide one or more flat sides, in contrast to the preferred generally cylindrical form.

The front and rear endshields 32 and 34 preferably support respective front and back bearings 44 and 46 that rotatably support the shaft 16. More particularly, the front endshield 32 preferably includes a radially inner hub 48 and a generally radially extending plate 50 extending outwardly from the hub 48. The hub 48 preferably supports the front bearing 44. The rear endshield 34 preferably includes a radially inner hub 52, a radially outer rim 54, and a plurality of radially extending spokes 56 extending between and interconnecting the hub 52 and the rim 54. The hub 52 preferably supports the rear bearing 46. A variety of endshield designs or use of entirely different means of rotatably supporting the shaft are permissible within the scope of the present invention, however.

The stator 14 is preferably mounted to the front and rear endshields 32 and 34. More particularly, as best shown in FIG. 2, a first plurality of fastener-receiving openings 58 is preferably formed through the front endshield 32, a second plurality of fastener-receiving 60 is preferably formed through the rear endshield 34, and a third plurality of fastener-receiving openings 62 is preferably formed through the stator core 22. Fasteners 64 preferably extend through corresponding ones of the fastener-receiving openings 58,60,62 to secure the stator core 22 relative to the front and rear endshields 32 and 34.

As noted previously, the controller 26 is preferably positioned in the controller chamber 40 defined by the dripshield 36 and the rear endshield 34. Preferably, the controller 26 includes a plurality of electronic components 66. The dripshield 36 is preferably positioned to protect the electronic components 66 from environmental contaminants.

In a preferred embodiment, the dripshield 36 defines an interface 68 through which one or more connections may be made to the controller 26 (e.g., by a thermostat, a power supply, etc.).

The rotor core 18 preferably comprises a magnetically conductive metallic material such as steel. It is permissible for any one or more of a variety of magnetically conductive materials to be used, however.

The rotor core 18 is preferably a monolithic structure. It is also permissible, however, for the rotor core to comprise a plurality of laminations.

The rotor core 18 is preferably generally cylindrical in form. More particularly, the rotor core 18 preferably includes a radially inner hub 70, a radially outer rim 72 defining an outer core margin 74, and a plurality of generally radially extending spokes 76 extending between and interconnecting the hub 70 and the rim 72.

Preferably, the magnets 20 are surface magnets arranged arcuately about the outer core margin 74 so as to present a radially outermost rotor margin 78. More particularly, each magnet 20 preferably presents a radially outermost magnet face 80 having arcuately spaced apart edges 82. The radially outermost magnet faces 80 preferably cooperatively define the radially outermost rotor margin 78. The radially outermost rotor margin 78 preferably presents at least a portion of a right circular cylinder having a radius R_rotor.margin and an axis A_rotor.margin that is coaxial with the rotor axis of rotation A_rotation.

In a preferred embodiment, each radially outermost magnet face 80 extends along a contour spanning an angle bounded by arcuately spaced apart endpoints 84 adjacent the magnet edges 82 but excluding chamfers, radiuses, or other conventional edge features. The endpoints 84 preferably correspond to points P6, as shown in FIG. 10.

Figure 8:
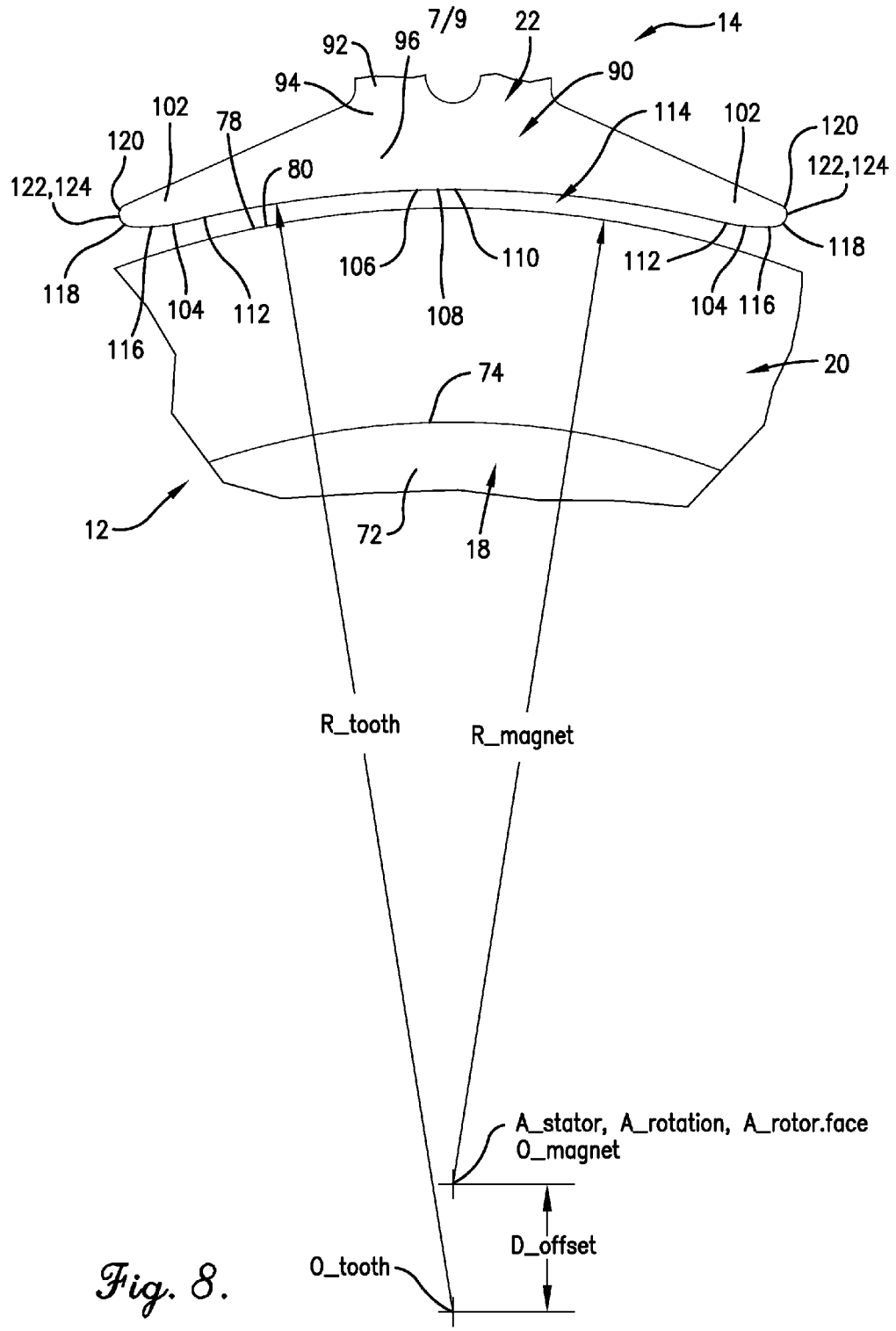
FIG. 8 is an enlarged top view of a portion of the stator tooth and rotor magnet/core of FIGS. 1, 2, 6, and 7, particularly illustrating the radii of curvature of the contours along which the tooth and magnet extend, as well as the offset between the center of the tooth radius of curvature and the rotor axis.

As best shown in FIG. 8, the contour is preferably an arc of a circle having a radius of curvature R_magnet and a center or origin O_magnet that lies on the coaxial rotor rotation and outermost face axes A_rotation and A_rotor.margin, respectively. That is, each magnet 20 preferably presents a radially outermost magnet face 80 that presents a portion of a right circular cylinder having an axis that passes through the corresponding magnet center O_magnet. Furthermore, the outermost magnet faces 80 cooperatively present the aforementioned right circular cylinder that is associated with the outermost rotor margin 78 and has the axis A_rotor.margin. Thus, R_magnet is equal to R_rotor.margin.

In a preferred embodiment, R_magnet and R_rotor.margin are each about one and five thousand, nine hundred sixty ten-thousandth (1.5960) inches.

It is noted that "extends along" as used herein should be interpreted to refer to a smoothed, averaged contour or trajectory generally following a specified path. For instance, a sine wave or zig-zag that oscillates (with or without a constant amplitude) about a line of equilibrium can be understood to "extend along" the line of equilibrium. Likewise, a punched surface that generally defines a portion of a right circular cylinder but includes burrs, nicks, or other imperfections can still be understood to "extend along" an arc of a circle despite such non-symmetrical irregularities. A plurality of interconnected straight segments may also be understood to extend generally along a smoothed line. All in all, when considering the contour or trajectory of a surface in its entirety, it is understood to be generally defined along an average, smooth path. In view of the above, it will be readily apparent to one of ordinary skill in the art whether or not deviations from the smooth, average contour or trajectory can be understood as "extending along" the specified path.

It is permissible according to some aspects of the present invention for the preferred magnet shapes and arrangements as described above to vary. For instance, according to some aspects of the present invention, one or more of the radially outermost magnet faces may extend along a contour forming an arc of a circle having a greater or lesser radius of curvature than others of the magnet face contours, such that the center for one or more of the contours is offset from the rotor rotation axis and/or the rotor margin axis, in addition to being offset from others of the magnet centers.

As noted previously, in a preferred embodiment, each of the radially outermost magnet faces extends along a curved contour that is defined entirely by an arc of a circle. Such a preferred contour can therefore be fully and straightforwardly characterized based on said circle. However, the principles of the present invention are equally applicable to alternative embodiments in which only a portion of one or more of the radially outermost magnet faces extends along an arc of circle. In such alternative embodiments, the contour may suitably be characterized based on only the circular portion thereof. For instance, a contour associated with an alternative embodiment might include a middle portion extending along an arc of a circle and a pair of straight end portions that deviate significantly from the trajectory of the middle portion. Characterization of the radially outermost magnet face based only on the circle that defines the middle portion of the contour (i.e., a fit that excludes the "outlier" straight end portions) would thus be appropriate to achieve a meaningful and high quality fit.

Preferably, in such an alternative embodiment, the circular portion of each radially outermost magnet face spans at least 25% of the aforementioned angle spanned by the contour. More preferably, the portion spans at least 50% of the angle, while still more preferably, the portion spans at least 75% of the angle. (Of course, in a preferred, fully circular embodiment, the "portion" spans the entire angle.) It is permissible according to some aspects of the present invention, however, for a non-centered portion of the contour to be the basis for its characterization and/or for the span of the portion to be less than 25% of the angle spanned by the contour.

Although not preferred, it is also permissible according to some aspects of the present invention for one or more of the radially outermost magnet faces to alternatively extend along a curved contour that does not include an arc of a circle or for which any existing arc of a circle is insignificant relative to the contour as a whole. That is, one or more of the radially outermost magnets faces might, in an alternative embodiment, extend along a portion of an oval, a portion of an ellipse, or a generic curve, rather than entirely or in part along an arc of a circle. For purposes of the present invention, such at least substantially non-circular contours associated with alternative embodiments are preferably characterized on the basis of a circle fit to the contour to achieve the highest quality fit. The quality of the fit may be characterized in any suitable manner known in the art (e.g., R-square value or root mean squared error).

In certain cases, the best-fit circle may be fit to the entirety of the at least substantially non-circular contour, while in other cases, the best-fit circle may more appropriately be fit to only a portion of the contour. For instance, similar to the partially circular alternative contour described above, a contour associated with an at least substantially non-circular embodiment might include a non-circular arcuate middle portion between a pair of straight end portions that deviate significantly from the trajectory of the middle portion. Fitting of a circle to only the middle portion of the contour (i.e., a fit that excludes the "outlier" straight end portions) would thus be appropriate to achieve a meaningful and high quality fit.

If, in an alternative embodiment, only a portion of such an at least substantially non-circular contour is used for fitting of a circle, such portion is preferably arcuately centered between the endpoints. Furthermore, such portion preferably spans at least 25% of the aforementioned angle spanned by the contour. More preferably, the portion spans at least 50% of the angle, while still more preferably, the portion spans at least 75% of the angle. (Most preferably, however, the contour is such that the portion spans the entire angle.) It is permissible according to some aspects of the present invention, however, for a non-centered portion of the contour to be the basis for its characterization and/or for the span of the portion to be less than 25% of the angle spanned by the contour.

Yet further, it is permissible according to some aspects of the present invention for the contour to be straight.

In a preferred embodiment, as illustrated, the contour and, in turn, the magnets 20 are generally symmetrical about a generally radial line of symmetry extending through the arcuately central point of the respective contour. Asymmetry of the contour and/or the magnets is permissible according to some aspects of the present invention, however.

Although each of the magnets 20 is preferably identical, it is permissible according to the present invention for the magnets to vary. For instance, as briefly noted above, a first plurality of the magnets might extend along an arc of a circle having a large radius of curvature, while a second plurality of magnets might extend along an arc of a circle having a relatively smaller radius of curvature. Yet further, a first plurality the magnets might extend along an arc of a circle, while a second plurality of magnets might extend along a portion of an ellipse. Further still, the magnets might vary in shape and/or size while still each extending along identical contours.

Figure 6:
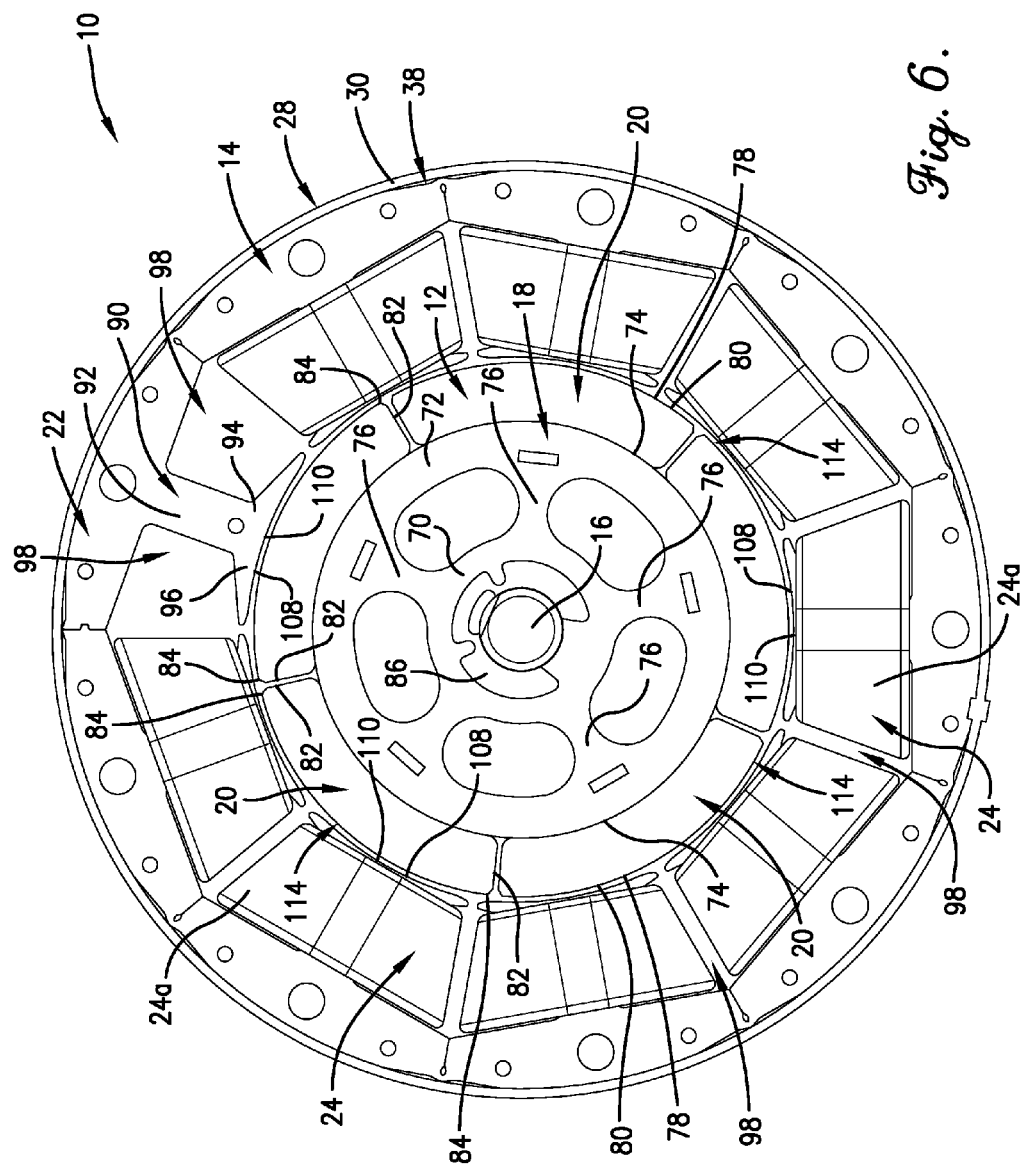
FIG. 6 is a front view of the rotor, stator, and housing of the motor of FIGS. 1 and 2, with one stator coil removed.

As best shown in FIGS. 2 and 6, the rotor 12 preferably includes five (5) of the magnets 20. More or fewer magnets may be provided without departing from the scope of the present invention, however.

Each of the magnets 20 is preferably a permanent magnet and, more particularly, a ferrite magnet. Various magnet materials (e.g., rare earth metals, such as neodymium) may be used, however, without departing from the scope of the present invention.

In a preferred embodiment, as best shown in FIGS. 2 and 6, the rotor core 18 is secured relative to the shaft 16 via at least one clamp 86.

As noted previously, the stator 14 preferably includes a stator core 22 and a plurality of coils 24 wound about the stator core 22. The stator core 22 is preferably generally toroidal and includes a yoke 88 and plurality of arcuately spaced apart teeth 90 extending generally radially inwardly from the yoke 88, such that the motor 10 is an inner rotor motor. It is permissible according to some aspects of the present invention, however, for the teeth to extend generally radially outwardly, such the motor is an outer rotor motor.

In a preferred embodiment, the yoke 88 defines a stator outer diameter from about three (3) inches to about eight (8) inches. More preferably, the stator outer diameter is from about four (4) inches to about seven (7) inches. Most preferably, the stator outer diameter is about five and one half (5.5) inches.

As will be discussed in greater detail below, each tooth 90 preferably includes a radially extending arm 92 having an end 94 and a generally arcuately extending crown 96 extending from the end 94. In the illustrated embodiment, each crown 96 projects from the radially innermost end of the respective arm 92, although the principles of certain aspects of the present invention are equally applicable to the crown being positioned elsewhere on the arm (e.g., at the radially outermost end of the arm in the case of an outer rotor motor).

The teeth 90 are preferably identical to each other, although variations are permissible according to some aspects of the present invention.

Furthermore, each tooth is preferably at least substantially symmetrical about a radially extending line of symmetry. Asymmetry is permissible according to some aspects of the present invention, however.

In a preferred embodiment, the teeth 90 define a plurality of slots 98 therebetween. The coils 24 are preferably wound about the teeth 90 so as to extend through the slots 98. The coils 24 preferably comprise electrically conductive wiring 24a. More particularly, the coils 24 preferably comprise aluminum or copper wiring 24a The stator core 22 is preferably an insulated stator core. More particularly, in a preferred embodiment, the stator 16 includes electrically insulative liners inserted in the slots 98. However, alternative insulation means fall within the ambit of the present invention. For instance, the core might be powder coated or overmolded with an electrically insulative material.

Preferably, the stator core 22 includes nine (9) teeth 90 defining nine (9) slots 98. Furthermore, the motor 10 preferably defines ten (10) poles. The motor 10 is therefore preferably a nine (9) slot, ten (10) pole motor. However, various numbers of slots and poles, including those that deviate from a preferred nine (9) slot:ten (10) pole ratio, are permissible without departing from the scope of the present invention.

The stator core 22 is preferably a laminated core comprising a plurality of laminations 100 each including a plurality of tooth portions 90a. Each lamination 100 is preferably formed from a single punched strip having ends 100a and 100b. The strip is bent into a generally toroidal form such that the ends 100a, 100b interconnect, as shown in FIG. 4 and others. It is permissible according to some aspects of the present invention, however, for an alternate construction to be used. The core might be a generally monolithic structure, for instance, and/or might include a plurality of arcuately extending, interconnecting segments. In another variation, the core might be formed of one or more helically wound laminations.

In a preferred embodiment, each of the features described herein with respect to the teeth 90 is also presented by the tooth portions 90a. For instance, as shown in FIG. 4, each tooth portion 90a includes an arm portion 92a having an end 94a and a crown portion 96a extending from the end 94a.

The stator core 22 preferably comprises steel and/or one or more electrically conductive materials. However, any one or more of a variety of suitable core materials may be used within the ambit of the present invention.

As noted previously, each stator tooth 90 preferably includes a radially extending arm 92 having an end 94 and a generally arcuately extending crown 96 extending from the end 94. Each crown 96 preferably presents a pair of arcuately spaced apart endmost tips 102, each of which has a rotor-facing side 104.

Figure 7:
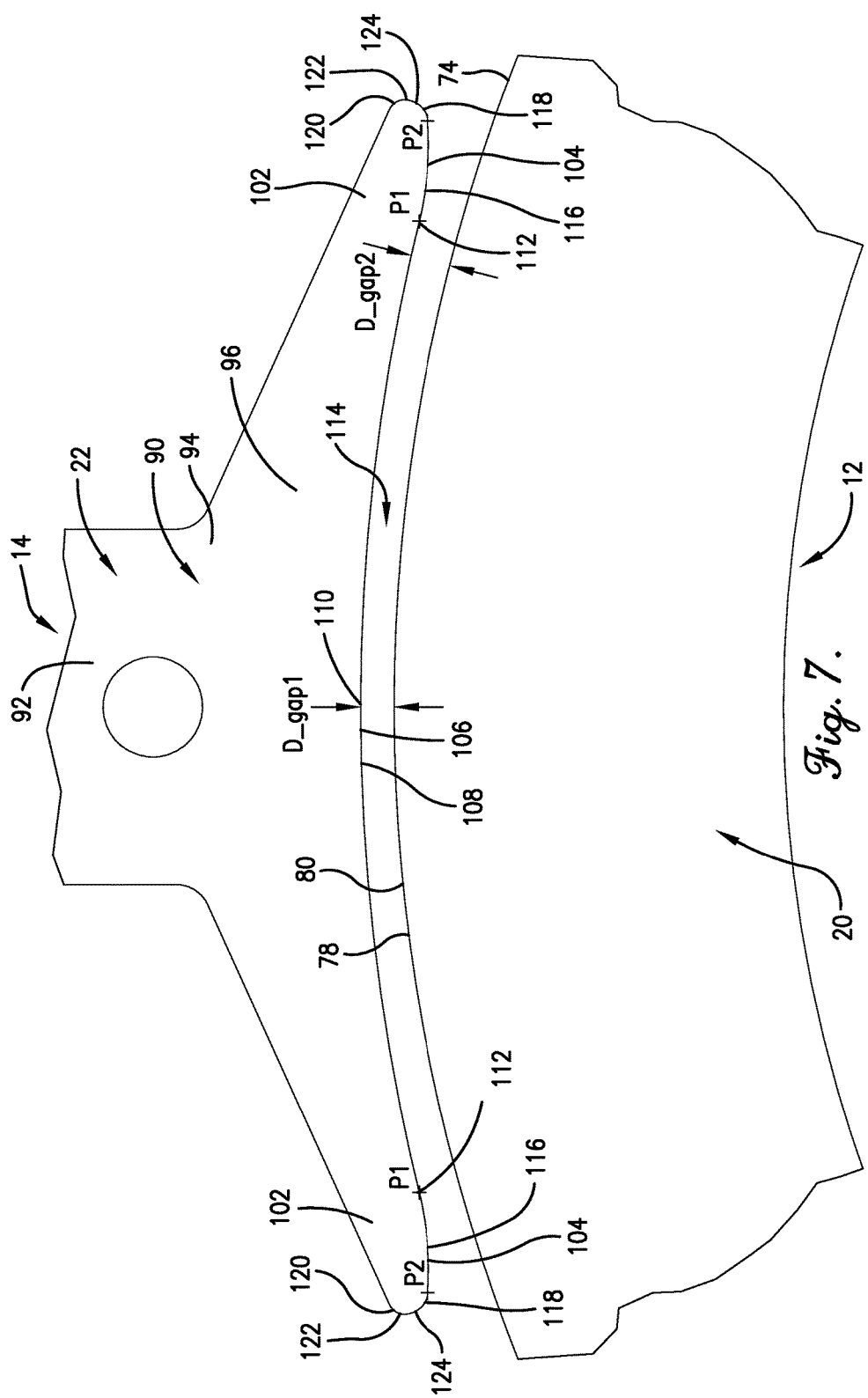
FIG. 7 is an enlarged top view of a portion of a stator tooth and rotor magnet of FIGS. 1, 2, and 6, particularly illustrating the tapered ends of the tooth and the varying radial dimensions of the gap between the tooth and the magnet.

Each crown 96 further preferably presents a rotor-facing surface 106 that presents a radially innermost tooth face 108. The rotor-facing surface 106 extends between and interconnects the rotor-facing sides 104. As shown in FIG. 7 and others, for instance, the rotor-facing surface 106 preferably extends between analogous points P1, while the two rotor-facing sides 104 extend between analogous sets of points P1 and P2.

In a preferred embodiment, each radially innermost tooth face 108 is curved and turns toward the rotor 12. That is, the innermost tooth face 108 is concave relative to the inwardly spaced rotor 12. It is permissible according to some aspects of the present invention, however for the innermost tooth face to be alternatively oriented or shaped. The innermost tooth face might include a plurality of straight segments that collectively turn toward the rotor, for instance, or might extend generally tangentially (i.e., in a straight line) or even turn away from the rotor (the latter being particularly likely in the case of an outer rotor motor).

In a preferred embodiment, the arcuately central points of each of the radially innermost tooth faces 108 cooperatively define a radially innermost stator core margin 110. As will be discussed in more detail below, due to the preferred shape of the innermost tooth faces 108, the portions of each tooth face 108 adjacent the arcuately central point are preferably radially outside the innermost stator core margin 110.

The innermost stator core margin 110 preferably presents at least a portion of a right circular cylinder having a radius R_stator.margin and an axis A_stator.margin. The axis A_stator.margin is preferably coaxial with the rotor axis of rotation A_rotation. A non-coaxial arrangement is permissible according to some aspects of the present invention, however.

More particularly, each radially innermost tooth face 108 preferably extends along a contour spanning an angle bounded by endpoints 112 (analogous to points P1) at the juncture of the rotor-facing surface 106 and respective ones of the rotor-facing sides 104. (See previous discussion of the interpretation of "extends along.") As best shown in FIG. 8, the contour is preferably an arc of a circle having a radius of curvature R_tooth and a center or origin O_tooth that is offset from the coaxial rotor rotation and stator core margin axes A_rotation and A_stator.margin, respectively. That is, each tooth 90 preferably presents a radially innermost tooth face 108 that presents a portion of a right circular cylinder having a radius R_tooth and an axis that passes through the corresponding tooth center O_tooth. Furthermore, the tooth radius R_tooth is different from and, preferably, larger than the stator radius R_stator.margin.

In view of the above, it will be apparent to those of ordinary skill in the art that the radially innermost tooth faces 108 and the radially outermost magnet faces 80 have offset concentricity, with the innermost tooth faces 108 being "flatter" than the outermost magnet faces 80.

It will also be apparent that, as shown in FIG. 8, the rotor rotation axis A_rotation is preferably positioned radially between each tooth center O_tooth and the radially innermost face 108. In particular, the tooth centers O_tooth and the rotor axis A_rotation are preferably offset by an offset distance D_offset that is between about 5% and 20% of the tooth radius of curvature R_tooth. More preferably, the offset distance D_offset is between about 10% and 20% of the tooth radius of curvature R_tooth. Most preferably, the offset distance D_offset is about 11%-13% of the tooth radius of curvature R_tooth.

For instance, in a preferred embodiment, R_tooth is about one and eight thousand, three hundred fifty-one ten-thousandth (1.8351) inches, R_stator.margin is about one and six thousand, two hundred sixty ten-thousandth (1.6260) inches, and D_offset is about two thousand ninety-one ten-thousandth (0.2091) inches.

Although the above-described configuration is preferred, it is permissible according to some aspects of the present invention for the tooth centers to be positioned radially between the rotor rotation axis and the radially innermost faces and/or for the relative magnitude of the offset distance to vary from the preferred configuration described above.

Preferably, provision of the offset between the tooth centers O_tooth and the rotor axis A_rotation and, more preferably, spacing of the tooth centers O_tooth further from the rotor magnets 20 than the rotor axis A_rotation is spaced from the magnets, serves to reduce the cogging torque of the motor 10.

It is also permissible according to some aspects of the present invention for the preferred tooth shapes and arrangements as described above to vary. Such permissible variations are similar to those discussed above with regard to the radially outermost magnet faces. For instance, according to some aspects of the present invention, one or more of the radially innermost tooth faces may extend along a contour forming an arc of a circle having a greater or lesser radius of curvature than others of the radially innermost tooth face contours, such that the center for one or more of the contours is offset from the rotor rotation axis and/or the rotor margin axis, in addition to being offset from others of the tooth centers.

As noted previously, in a preferred embodiment, each of the radially innermost tooth faces extends along a curved contour that is defined entirely by an arc of a circle. Such a preferred contour can therefore be fully and straightforwardly characterized based on said circle. However, the principles of the present invention are equally applicable to alternative embodiments in which only a portion of one or more of the radially innermost tooth faces extends along an arc of circle. In such alternative embodiments, the contour may suitably be characterized based on only the circular portion thereof. For instance, a contour associated with an alternative embodiment might include a middle portion extending along an arc of a circle and a pair of straight end portions that deviate significantly from the trajectory of the middle portion. Characterization of the tooth face based only on the circle that defines the middle portion of the contour (i.e., a fit that excludes the "outlier" straight end portions) would thus be appropriate to achieve a meaningful and high quality fit.

Preferably, in such an alternative embodiment, the circular portion of each radially innermost tooth face spans at least 25% of the aforementioned angle spanned by the contour. More preferably, the portion spans at least 50% of the angle, while still more preferably, the portion spans at least 75% of the angle. (Of course, in a preferred, fully circular embodiment, the "portion" spans the entire angle.) It is permissible according to some aspects of the present invention, however, for a non-centered portion of the contour to be the basis for its characterization and/or for the span of the portion to be less than 25% of the angle spanned by the contour.

Although not preferred, it is also permissible according to some aspects of the present invention for one or more of the radially innermost tooth faces to alternatively extend along a curved contour that does not include an arc of a circle or for which any existing arc of a circle is insignificant relative to the contour as a whole. That is, one or more of the radially innermost tooth faces might, in an alternative embodiment, extend along a portion of an oval, a portion of an ellipse, or a generic curve, rather than entirely or in part along an arc of a circle. For purposes of the present invention, such at least substantially non-circular contours associated with alternative embodiments are preferably characterized on the basis of a circle fit to the contour to achieve the highest quality fit. The quality of the fit may be characterized in any suitable manner known in the art (e.g., R-square value or root mean squared error).

In certain cases, the best-fit circle may be fit to the entirety of the contour, while in other cases, the best-fit circle may more appropriately be fit to only a portion of the contour. For instance, similar to the partially circular alternative contour described above, a contour associated with an alternative at least substantially non-circular embodiment might include a non-circular arcuate middle portion between a pair of straight end portions that deviate significantly from the trajectory of the middle portion. Fitting of a circle to only the middle portion of the contour (i.e., a fit that excludes the "outlier" straight end portions) would thus be appropriate to achieve a meaningful and high quality fit.

If, in an alternative embodiment, only a portion of such an at least substantially non-circular contour is used for fitting of a circle, such portion is preferably arcuately centered between the endpoints. Furthermore, such portion preferably spans at least 25% of the aforementioned angle spanned by the contour. More preferably, the portion spans at least 50% of the angle, while still more preferably, the portion spans at least 75% of the angle. (Most preferably, however, the contour is such that the portion spans the entire angle.) It is permissible according to some aspects of the present invention, however, for a non-centered portion of the contour to be the basis for its characterization and/or for the span of the portion to be less than 25% of the angle spanned by the contour.

Yet further, it is permissible according to some aspects of the present invention for the contour to be straight.

In a preferred embodiment, as illustrated, the contour is symmetrical about a generally radial line of symmetry extending through the arcuately central point. Asymmetry of the contour is permissible according to some aspects of the present invention, however.

Although the teeth 90 are preferably identical, it is permissible according to the present invention for the teeth to vary. For instance, as briefly noted above, a first plurality of the crowns might each extend along an arc of a circle having a large radius of curvature, while a second plurality of crowns might each extend along an arc of a circle having a small radius of curvature. Yet further, a first plurality the crowns might each extend along an arc of a circle, while a second plurality of crowns might each extend along a portion of an ellipse. Further still, the crowns might vary in shape and/or size while still each extending along identical contours.

As will be apparent to one of ordinary skill in the art, in the preferred inner rotor motor configuration, the aforementioned cylinder associated with the radially outermost rotor margin 78 (i.e., the cylinder having a radius R_rotor.margin) presents a diameter that is smaller than that associated with the radially innermost stator core margin 110 (i.e, the cylinder having a radius R_stator.margin). More particularly, a radial gap 114 extends circumferentially between the rotor 12 and the stator 14.

As best shown in FIG. 7, in a preferred embodiment, the radial dimension of the gap 114 varies along each radially innermost tooth face 108, in keeping with the offset concentricity of the innermost tooth faces 108 and the radially outermost magnet faces 80. More particularly, a gap dimension D_gap1 taken at the apex of the crown 96 (where the gap is preferably smallest) is less than a gap dimension D_gap2 taken an arcuate distance away from the apex of the crown 96.

In a preferred embodiment, D_gap1 is about three hundred and one ten-thousandth (0.0301) inches.

As noted previously, each tooth crown 96 preferably presents a pair of arcuately spaced apart endmost tips 102, each of which has a rotor-facing side 104. As best shown in FIGS. 7 and 10, each rotor-facing side 104 preferably includes a tapered portion 116 that turns away from the rotor 12. That is, each tapered portion 116 is convex relative to the to the inwardly spaced rotor 12.

Preferably, provision of the tapered portions 116 serves to reduce the cogging torque of the motor 10.

Each rotor-facing side 104 further preferably includes an inner punch-relief portion 118 arcuately outward of and adjacent the tapered portion 116 and an outer punch-relief portion 120 radially outward from the inner punch-relief portion 118. The pair of tapered portions 116 associated with each tooth 90 are thus positioned arcuately between the two corresponding inner punch-relief portions 118.

More particularly, as shown in FIGS. 7 and 9, the tapered portions 116 preferably extend between points P1 and P2, the inner punch-relief portions 118 extend between points P2 and P3, and the outer punch-relief portions 120 extend between points P4 and P5.

The punch-relief portions 118,120 are preferably provided in keeping with conventional manufacturing practices to increase die life. It is permissible according to some aspects of the present invention, however, for the punch-relief portions to be omitted entirely.

The tapered portion 116 and the punch-relief portions 118,120 each preferably extend along respective arcs of circles (see previous discussion of the interpretation of "extend along") and present respective radii of curvature R_taper, R_inner.relief, and R_outer.relief. It is permissible, however, for one or more of the tapered portions or punch-relief portions to extend along an alternative contour in the manner described above with respect to the radially outermost magnet faces 80 and the radially innermost tooth faces 108. In such an alternative configuration, the radius of curvature corresponds to a best-fit circle over the given region of interest, also the manner discussed above with respect to both the radially outermost magnet faces 80 and the radially innermost tooth faces 108.

In a preferred embodiment, the tapered portion 116 has a taper radius of curvature R_taper that is greater than both punch-relief radii of curvature R_inner.relief and R_outer.relief. Most preferably, the tapered portion 116 has a taper radius of curvature R_taper that is at least ten (10) times the punch-relief radii of curvature R_inner.relief and R_outer.relief. In a preferred embodiment, for instance, the taper radius of curvature R_taper is preferably about two thousand, nine hundred sixteen ten-thousandth (0.2916) inches, while the punch-relief radii of curvature R_inner.relief and R_outer.relief are each preferably each between about five thousandth (0.005) inches and twenty-five thousandth (0.025) inches and are most preferably about twenty thousandth (0.020) inches and fifteen thousandth (0.015) inches, respectively.

Each tip 102 has a thickness T_tip measured parallel to or tangentially relative to an arcuately outermost margin 122 of the tip 102 based on tip geometry immediately inwardly adjacent the punch-relief portions 118,120 (i.e., at points P2 and P5).

In a preferred embodiment, the outermost margin 122 is associated with a flat region 124 of the tip 102, although it is permissible for the outermost tip margin to be defined by a curved surface instead. The flat region preferably extends between points P3 and P4.

Preferably, the taper radii of curvature R_taper are at least about three (3) times the corresponding tip thicknesses T_tip and, more preferably, about ten (10) times the corresponding thicknesses T_tip.

For instance, in a preferred embodiment, as noted previously, the taper radii of curvature R_taper are about two thousand, nine hundred sixteen ten-thousandth (0.2916) inches, while the tip thicknesses T_tip are about two hundred ninety-three ten-thousandth (0.0293) inches.

Although it is preferred that the tips 102 are identical to each other, in keeping with the preferred uniformity of the teeth 90 as discussed above, it is within the scope of the present invention for the tips to vary from each other.

As noted previously, it has been determined that the above-described provision of an offset between the tooth centers O_tooth and the rotor axis A_rotation (and, more preferably, spacing of the tooth centers O_tooth further from the rotor magnets 20 than the rotor axis A_rotation is spaced from the magnets) serves to reduce the cogging torque of the motor 10. As also noted previously, it has also been determined that provision of the tapered portions 116 serves to reduce the cogging torque of the motor 10. It is therefore preferable according to the present invention to reduce motor cogging torque by providing both the aforementioned offset and the aforementioned tapered portions.

Although the above description presents features of preferred embodiments of the present invention, other preferred embodiments may also be created in keeping with the principles of the invention. Furthermore, these other preferred embodiments may in some instances be realized through a combination of features compatible for use together despite having been presented independently in the above description.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention set forth in the following claims.

What is claimed is:

1. An electric motor for use in a machine, said motor comprising:
    a rotor rotatable about a rotor axis; and
    a stator at least substantially circumscribing the rotor,
    said stator including a generally toroidal core including a plurality of arcuately spaced apart, radially inwardly extending teeth,
    each of said teeth defining a pair of arcuately outermost margins,
    each of said teeth presenting a radially innermost face that extends along a curved contour at least substantially arcuately centered between the outermost margins,
    a portion of said contour having a radius of curvature that corresponds to a circle having a center,
    said center being radially offset from the rotor axis,
    said portion being at least substantially arcuately centered between the outermost margins,
    said contour having arcuately spaced apart first and second endpoints,
    said contour spanning an angle bounded by the first and second endpoints,
    said portion spanning at least 25% of the angle.
2. The electric motor as claimed in claim 1,
    said rotor axis being radially between the center and the radially innermost face.
3. The electric motor as claimed in claim 2,
    said center being radially offset from the rotor axis by an offset distance,
    said offset distance being between about 5% and about 20% of the radius of curvature.
4. The electric motor as claimed in claim 3,
    said offset distance being between about 10% and about 20% of the radius of curvature.
5. The electric motor as claimed in claim 4,
    said offset distance being between about 11% and 13% of the radius of curvature.

6. The electric motor as claimed in claim 1,
said contour being at least substantially symmetrical about a radial line of symmetry.

7. The electric motor as claimed in claim 6,
said contour being an arc of a circle.

8. The electric motor as claimed in claim 7,
said radially innermost face defining a portion of a right circular cylinder.

9. The electric motor as claimed in claim 8,
said rotor presenting a radially outermost face defining a portion of a second right circular cylinder.

10. The electric motor as claimed in claim 9,
said second cylinder having a cylinder axis that is coaxial with the rotor axis.

11. The electric motor as claimed in claim 10,
said first and second cylinders having respective first and second diameters,
said second cylinder having a smaller diameter than said first cylinder.

12. The electric motor as claimed in claim 6,
each of said teeth being symmetrical about the radial line of symmetry.

13. The electric motor as claimed in claim 1,
said motor being a 9 slot, 10 pole motor.

14. The electric motor as claimed in claim 1,
each of said teeth including a radially extending arm having an end and a crown extending relative to the end,
said crown presenting a pair of arcuately spaced apart endmost tips,
each of said tips presenting a rotor-facing side,
said rotor-facing side including a tapered portion that turns away from the rotor,
each of said tapered portions being curved.

15. The electric motor as claimed in claim 14,
said rotor-facing side including a punch-relief portion having a punch-relief radius of curvature,
said tapered portion being adjacent the punch-relief portion and having a taper radius of curvature that is greater than the punch-relief radius of curvature.

16. The electric motor as claimed in claim 15,
said taper radii of curvature being at least 10 times said punch-relief radii of curvature.

17. The electric motor as claimed in claim 16,
said punch-relief radii of curvature being between about 0.005 inches and 0.025 inches.

18. The electric motor as claimed in claim 16,
said taper radii of curvature being about 0.2916 inches,
said punch-relief radii of curvature being in a range from about 0.015 inches to 0.020 inches.

19. The electric motor as claimed in claim 16,
said portion extending between and interconnecting the tapered portions,
said tapered portions extending between and interconnecting the portion and adjacent ones of the punch-relief portions.

20. The electric motor as claimed in claim 15,
said pair of tapered portions being positioned arcuately between said pair of punch-relief portions.

21. The electric motor as claimed in claim 14,
each of said tapered portions extending along an arc of a circle.

22. The electric motor as claimed in claim 14,
each of said tips having a thickness,
said taper radii of curvature being at least about 3 times the corresponding thickness.

23. The electric motor as claimed in claim 22,
said taper radii of curvature being about 10 times the corresponding thickness.

24. The electric motor as claimed in claim 23,
said taper radii of curvature being about 0.2916 inches,
said tip thicknesses being about 0.0293 inches.

25. The electric motor as claimed in claim 14,
said crown further presenting the radially innermost face,
said radially innermost face extending between and interconnecting the rotor-facing sides.

26. The electric motor as claimed in claim 1,
said portion spanning at least 50% of the angle.

27. The electric motor as claimed in claim 26,
said portion spanning the entire angle.

28. The electric motor as claimed in claim 1,
said portion of the contour extending continuously arcuately.

29. An electric motor for use in a machine, said motor comprising:
a rotor rotatable about a rotor axis; and
a stator at least substantially circumscribing the rotor,
said stator including a generally toroidal core including a plurality of arcuately spaced apart, radially inwardly extending teeth,
each of said teeth defining a pair of arcuately outermost margins,
each of said teeth presenting a radially innermost face that extends along a curved contour,
said radially innermost face defining a face center at least substantially centered between said margins,
said contour extending along said face center,
a portion of said contour having a radius of curvature that corresponds to a circle having a circle center,
said circle center being radially offset from the rotor axis,
said portion extending along said face center,
said contour having arcuately spaced apart first and second endpoints,
said contour spanning an angle bounded by the first and second endpoints,
said portion spanning at least 25% of the angle.

30. The electric motor as claimed in claim 29,
said rotor axis being radially between the circle center and the radially innermost face.

31. The electric motor as claimed in claim 30,
said circle center being radially offset from the rotor axis by an offset distance,
said offset distance being between about 5% and about 20% of the radius of curvature.

32. The electric motor as claimed in claim 31,
said offset distance being between about 10% and about 20% of the radius of curvature.

33. The electric motor as claimed in claim 32,
said offset distance being between about 11% and 13% of the radius of curvature.

* * * * *